United States Patent
Bultman et al.

(10) Patent No.: US 11,541,854 B2
(45) Date of Patent: Jan. 3, 2023

(54) ELECTRONIC PARKING BRAKE CONTROL AND OVERRIDE SYSTEM

(71) Applicant: Toyota Motor Engineering & Manufacturing North America, Inc., Plano, TX (US)

(72) Inventors: Jeremy Daniel Bultman, Peoria, AZ (US); Robert Allan Ditner, Peoria, AZ (US); Randall Steven Badia, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 373 days.

(21) Appl. No.: 16/835,059

(22) Filed: Mar. 30, 2020

(65) Prior Publication Data

US 2021/0300308 A1    Sep. 30, 2021

(51) Int. Cl.
| | |
|---|---|
| *B60T 8/17* | (2006.01) |
| *B60T 17/22* | (2006.01) |
| *B60T 7/02* | (2006.01) |
| *B60Q 9/00* | (2006.01) |
| *B60T 8/32* | (2006.01) |

(52) U.S. Cl.
CPC ............... *B60T 8/17* (2013.01); *B60Q 9/002* (2013.01); *B60T 7/02* (2013.01); *B60T 8/321* (2013.01); *B60T 17/22* (2013.01); *B60T 2220/04* (2013.01); *B60T 2250/00* (2013.01); *B60T 2250/04* (2013.01)

(58) Field of Classification Search
CPC .... B60T 8/17; B60T 2220/04; B60T 2250/00; B60T 2250/04; B60T 17/22; B60T 7/02; B60T 7/085; B60T 7/12; B60T 7/18; B60T 2260/04; B60Q 9/002
USPC ......................................................... 701/70
See application file for complete search history.

(56) References Cited

U.S. PATENT DOCUMENTS 6,663,195 B1 * 12/2003 Arnold .................... B60T 7/042
                                                            303/122.03
6,905,181 B2 *  6/2005 Iwagawa ............. B60T 8/17616
                                                                701/76

(Continued)

FOREIGN PATENT DOCUMENTS

| CN | 102414065 A | * | 4/2012 | ............ B60T 13/741 |
| CN | 103419771 A | * | 12/2013 | ............... B60Q 1/00 |

(Continued)

*Primary Examiner* — Atul Trivedi
(74) *Attorney, Agent, or Firm* — Snell & Wilmer LLP

(57) ABSTRACT

An electronic parking brake control system and method for controlling a parking brake of a vehicle. The system includes an electronic parking brake variable switch configured to produce an application signal based on an amount or an amount of time the switch is pulled upward or pushed downward. The system also includes an indicator configured to indicate an amount of application of the parking brake based on the application signal. The system also includes an electronic brake unit coupled to the electronic parking brake variable switch. The electronic brake unit is configured to receive the application signal, and transmit a rear brake signal to a plurality of rear brake actuators to apply a plurality of rear brakes based on the application signal when a speed of the vehicle is below a threshold speed or the vehicle is in a low gear.

20 Claims, 2 Drawing Sheets

(56) References Cited

U.S. PATENT DOCUMENTS

| | | | |
|---|---|---|---|
| 6,991,302 B2 | 1/2006 | Nilsson et al. | |
| 7,358,864 B2* | 4/2008 | Mori | B60T 7/12 340/436 |
| 8,041,475 B2* | 10/2011 | Fujita | B60T 7/12 307/10.6 |
| 8,086,384 B2 | 12/2011 | Nakayama | |
| 8,532,902 B2 | 9/2013 | Bentner et al. | |
| 8,820,857 B2 | 9/2014 | Eberling et al. | |
| 8,858,392 B2 | 10/2014 | Dix et al. | |
| 9,010,503 B2 | 4/2015 | Beier et al. | |
| 9,409,555 B2 | 8/2016 | Yamanoto et al. | |
| 9,573,577 B2 | 2/2017 | Hilberer et al. | |
| 10,239,502 B2 | 3/2019 | Leinung et al. | |
| 10,442,413 B2 | 10/2019 | Tanaka et al. | |
| 10,501,062 B2 | 12/2019 | Wulf | |
| 2003/0006644 A1* | 1/2003 | MacGregor | B60T 13/261 303/3 |
| 2004/0140710 A1* | 7/2004 | Alvarez | B60T 13/741 303/20 |
| 2005/0006950 A1 | 1/2005 | Versteyhe | |
| 2005/0264099 A1* | 12/2005 | Kamiya | B60T 7/22 303/15 |
| 2010/0294602 A1 | 11/2010 | Gustafsson et al. | |
| 2013/0314222 A1* | 11/2013 | Park | B60T 13/741 340/453 |
| 2015/0224969 A1* | 8/2015 | Huennekens | B60T 8/17 701/70 |
| 2018/0001879 A1 | 1/2018 | Witte | |
| 2018/0037200 A1* | 2/2018 | Otake | B60T 13/12 |
| 2018/0237016 A1* | 8/2018 | Khafagy | B60T 8/245 |
| 2019/0100191 A1* | 4/2019 | Kikkawa | F16D 66/021 |
| 2019/0135249 A1* | 5/2019 | Fridman | F16D 55/226 |
| 2019/0279447 A1* | 9/2019 | Ricci | G06Q 20/145 |
| 2020/0309261 A1* | 10/2020 | Van Camp | F16H 59/105 |
| 2021/0300308 A1* | 9/2021 | Bultman | B60T 7/085 |

FOREIGN PATENT DOCUMENTS

| | | | | |
|---|---|---|---|---|
| CN | 107054336 A | * | 8/2017 | B60K 37/02 |
| DE | 102008019573 A1 | * | 10/2008 | B60T 13/746 |
| DE | 102008006265 A1 | * | 8/2009 | B60T 13/746 |
| DE | 102011084534 A1 | * | 4/2012 | B60T 13/588 |
| DE | 102017130416 A1 | * | 6/2018 | B60T 8/176 |
| JP | 5731843 B2 | * | 6/2015 | |
| KR | 20160148208 A | * | 12/2016 | B60T 13/74 |
| KR | 101870633 B1 | * | 6/2018 | B60T 7/12 |
| WO | 2004078550 A1 | | 9/2004 | |
| WO | WO-2014155182 A1 | * | 10/2014 | B60T 13/588 |
| WO | WO-2016158569 A1 | * | 10/2016 | B60T 13/586 |
| WO | WO-2019163597 A1 | * | 8/2019 | B60T 13/662 |

* cited by examiner

ELECTRONIC PARKING BRAKE CONTROL
AND OVERRIDE SYSTEM

BACKGROUND

Field

This disclosure relates to an electronic parking brake control and override system.

Description of the Related Art

The main function of parking brakes is to prevent the vehicle from moving when the vehicle is parked. Parking brakes may also prevent the vehicle from moving backwards, such as when the vehicle is on an upward slope and/or the driver has released the brake pedal. Parking brakes are generally used to control the rear brakes or wheels of the vehicle.

In some older vehicles, the parking brake is a manual or mechanical parking brake such that the driver is able to pull a handbrake lever upwards to engage the rear brakes. More specifically, when the driver pulls the handbrake lever upwards, a cable, connecting the handbrake lever to the brake pads, increases in tension causing the brake pads to come into contact with the brake drums or discs, thus preventing the rear wheels from moving.

In some newer vehicles, the parking brake is an electronic parking brake such that no cables exist. The electronic parking brake uses electronic components to instantaneously and fully engage the rear brakes when the parking brake lever is pulled upward. There is a need for a system and a method to more accurately and variably control and apply electronic parking brakes.

SUMMARY

In general, one aspect of the subject matter described in this disclosure may be embodied in an electronic parking brake control system for controlling the rear brakes of a vehicle. These and other aspects or embodiments may optionally include one or more of the following features. The system includes a vehicle speed sensor configured to detect a speed of the vehicle, a driving mode sensor configured to determine whether the vehicle is in a low gear, and an electronic parking brake variable switch configured to produce an application signal based on an amount or an amount of time the electronic parking brake variable switch is pulled upward or pushed downward. The system includes an indicator configured to indicate an amount of application of the rear brakes based on the application signal. The system also includes an electronic control unit coupled to the electronic parking brake variable switch. The electronic control unit is configured to transmit a rear brake signal to apply the rear brakes based on the application signal when the speed of the vehicle is below a threshold speed or the vehicle is in the low gear.

Another aspect of the subject matter described in this disclosure may be embodied in an electronic parking brake control system for controlling a parking brake of a vehicle. These and other aspects or embodiments may optionally include one or mom of the following features. The system may include a vehicle speed sensor configured to detect a speed of the vehicle, a driving mode sensor configured to determine when the vehicle is in a low gear, and an electronic parking brake variable switch configured to produce an application signal based on an amount or an amount of time the switch is pulled upward or pushed downward. The system also includes an indicator configured to indicate an amount of application of the parking brake based on the application signal. The system also includes an electronic brake unit coupled to the electronic parking brake variable switch. The electronic brake unit is configured to receive the application signal, and transmit a rear brake signal to a plurality of rear brake actuators to apply a plurality of rear brakes based on the application signal when the speed of the vehicle is below a threshold speed or the vehicle is in the low gear.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, vehicles and methods for more accurately and variably controlling and applying electronic parking brakes. Particular embodiments of the subject matter described in this disclosure may be implemented to realize one or more of the following advantages. A graduated or variable electronic parking brake control system provides an electronic parking brake variable switch that allows a driver to engage or disengage the rear brakes in a variable manner. For example, using an electronic parking brake variable switch, similar to a power window switch, the driver can gradually increase or decrease the amount of braking using the rear brakes. Hence, the driver of the vehicle is able to variably engage and disengage the parking brake or rear brakes by pulling up or pushing down an electronic parking brake variable switch. This advantageously allows the driver to slow down the vehicle using only the rear brakes in a variable manner.

The system also provides a display or an indicator to show the driver the amount or the percentage of application of the rear brakes. The amount of application is between 0 percent and 100 percent. In one example, a plurality of lights (e.g., 6 lights) can each indicate about a 16 percent application of the rear brakes. In another example, the plurality of lights (e.g., 4 lights) can each indicate a 25 percent application of the rear brakes. The display or display screen 120 can also display a variable percentage between 0 and 100 (e.g., 5, 12, 17, 26, 35, etc.) of the application of the rear brakes based on the amount or the amount of time the electronic parking brake variable switch is pulled upward or pushed downward. The variability of application of the electronic parking brake variable switch allows the driver to accurately adjust exactly how much or how little to apply the mar brakes based on the present vehicle position, speed, gear and/or situation. In certain situations, the electronic parking brake control system can be disabled. For example, if the speed of the vehicle is greater than a threshold speed and/or the vehicle is not in a low gear, then the electronic parking brake control system does not allow application or activation of the rear brakes.

Figure 1:
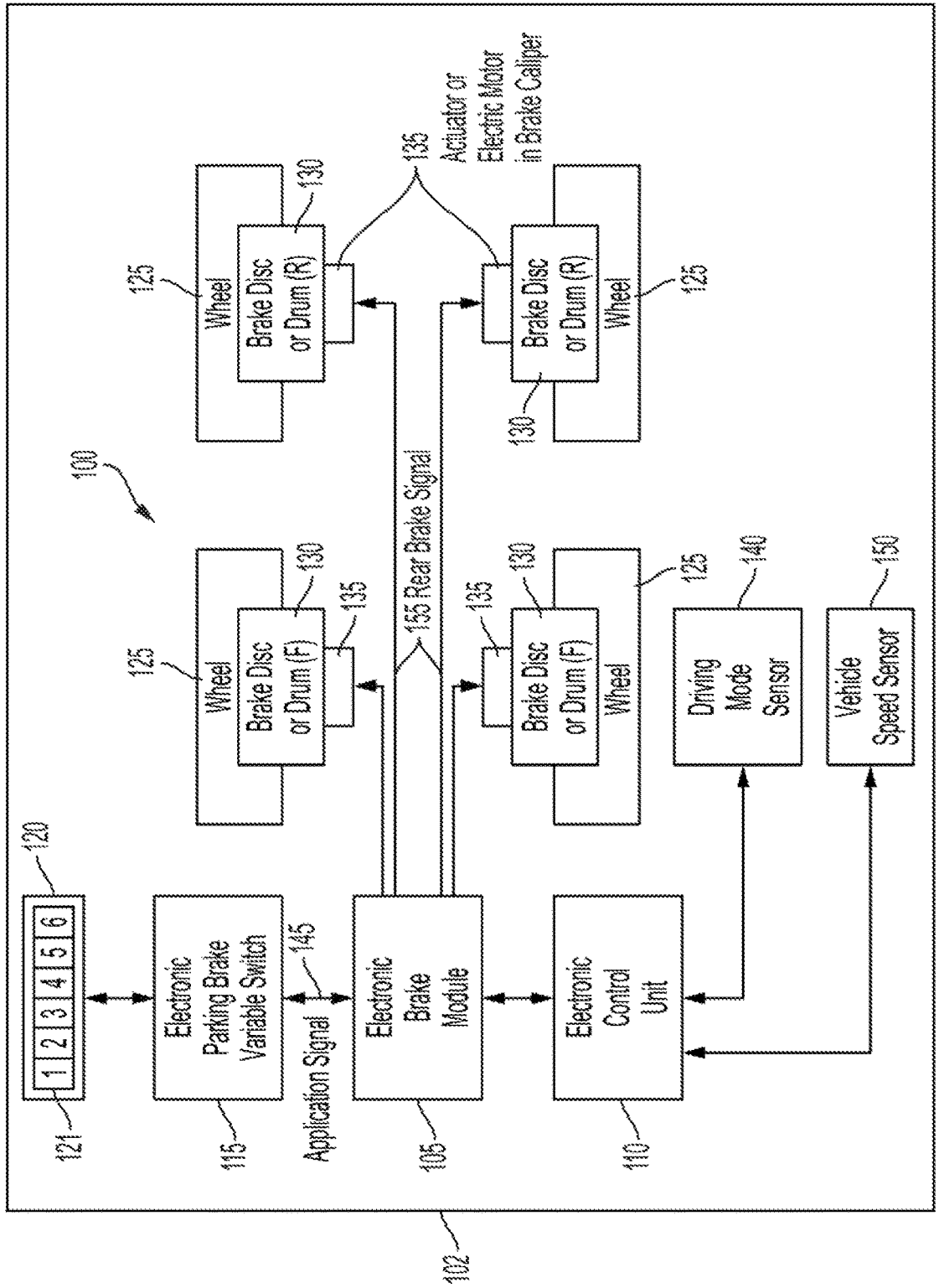
FIG. 1 is a block diagram of an example electronic parking brake control system according to an aspect of the invention.

FIG. 1 is a block diagram of an example electronic parking brake control system 100 for controlling a parking brake of a vehicle 102. The electronic parking brake control system 100 may be retro-fitted, be part of, coupled to, include or be included within the vehicle 102. The vehicle 102 is a conveyance capable of transporting a person, an object, or a permanently or temporarily affixed apparatus. The vehicle 102 may be a self-propelled wheeled conveyance, such as a car, a sports utility vehicle, a truck, a bus, a van or other motor, battery, or fuel cell driven vehicle. For example, the vehicle 102 may be an electric vehicle, a hybrid vehicle, a hydrogen fuel cell vehicle, a plug-in hybrid vehicle or any other type of vehicle that has an engine, a fuel cell stack, a motor and/or a generator. Other examples of vehicles include bicycles, trains, planes, or boats, and any other form of conveyance that is capable of transportation. The vehicle 102 may be semi-autonomous or autonomous. That is, the vehicle 102 may be self-maneuvering and navigate without human input. An autonomous vehicle may have and use one or more sensors and/or a navigation unit to drive autonomously.

The electronic parking brake control system 100 may include an electronic brake module or unit 105 ("EBU 105"), an electronic control unit 110 ("ECU 110"), an electronic parking brake variable switch 115 ("switch 115"), a display or an indicator 120, a plurality of lights 121, wheels 125, brake discs or drums/rotors 130 ("rear brakes 130"), actuators or electric motors 135 in brake calipers to control the rear brakes 130, a driving mode sensor 140, and a vehicle speed sensor 150. The term "rear brakes" may refer to the brakes that are applied when the electronic parking brake variable switch 115 is activated. The "rear brakes" may be different from or the same as the brakes that are applied when the driver depresses the brake pedal. The rear brakes may include one or more brake discs, brake drums and/or brake rotors.

The EBU 105 and the ECU 110 can be separate units or can be combined as a single unit. The EBU 105 and the ECU 110 can each include one or more processors and a memory. The EBU 105 and the ECU 110 may be electrically connected or coupled to some or all the other components including one or more vehicle components of the vehicle 102. For example, the EBU 105 and/or the ECU 110 may be connected or coupled to the electronic parking brake variable switch 115, the display or the indicator 120, the plurality of lights 121, the wheels 125, the rear brakes 130, the actuators or electric motors 135 in the brake calipers, the driving mode sensor 140, and the vehicle speed sensor 150.

The switch 115 can be located in the vehicle 102 so that is can be easily accessed and controlled by the driver. For example, the switch 115 can be located next to the gear shifter or on the control panel of the vehicle 102 so that the driver can easily reach it. The switch 115 can be similar to a power window switch. That is, the switch 115 allows the driver to variably adjust the percentage application of the rear brakes 130.

The switch 115 is configured to generate or produce an application signal 145 based on an amount or an amount of time the switch 115 is pulled upward or pushed downward. When the switch 115 is pulled slightly upward, the application signal 145 increases indicting that the rear brakes 130 are to be gradually applied. When the switch 115 is released by the driver, the application signal is set at that application amount. When the switch 115 is pulled all the way upward, the application signal 145 increases to 100 percent indicting that the rear brakes 130 are to be fully applied. When the switch 115 is pushed slightly downward, the application signal 145 decreases indicting that the rear brakes 130 are to be gradually released. When the switch 115 is released by the driver, the application signal is set at that application amount. When the switch 115 is pushed all the way down, the application signal 145 decreases all the way to zero indicting that the rear brakes 130 are to be fully released.

The display or the indicator 120 may be a plurality of lights 121 and/or a numeric number or graph displayed on a display screen of the vehicle 102. The display or the indicator 120 is configured to display or indicate an amount or a percentage of application of the rear brakes 130 based on the application signal 145. The amount of application is between 0 percent and 100 percent. In one example, the plurality of lights 121 (e.g., 6 lights) can each indicate about a 16 percent application of the rear brakes 130. In another example, the plurality of lights 121 (e.g., 4 lights) can each indicate a 25 percent application of the rear brakes 130.

When the plurality of lights 121 are all off, this means that the rear brakes 130 are not activated or engaged. When the plurality of lights 121 are all on, this means that the rear brakes 130 are fully activated or engaged. Zero percent application means the rear brakes 130 are not activated or engaged and 100 percent application means the ear brakes 130 are fully activated or engaged.

The display or display screen 120 can also display a variable percentage between 0 and 100 (e.g., 5, 12, 17, 26, 35, etc.) of the application of the rear brakes 130 based on the amount or the amount of time the switch 115 is pulled upward or pushed downward. The variability of application of the switch 115 allows the driver to accurately adjust exactly how much or how little to apply the rear brakes 130 based on one or more of the following conditions: the present vehicle position (e.g., curvy road), speed of the vehicle, gear of the vehicle, grade of the road (e.g., steep decline of greater than 10 percent), outside condition (e.g., snowing) or condition of the road (e.g., wet or gravel) and/or other conditions or situations. In various embodiments, the safer the conditions, the greater the application of the rear brakes 130.

TABLE 1

Example Road Conditions with Example Applications of the Rear Brakes

| Example Road Conditions | Example Applications of the Rear Brakes |
| --- | --- |
| Straight Road | 0-100 percent |
| Decline Road | 0-100 percent (may or may not be proportional to percentage decline) |
| Incline Road | 0-100 percent (may or may not be proportional to percentage incline) |
| Sunny | 0-100 percent |
| Snowing | 0-50 percent |
| Raining | 0-50 percent |
| Smooth Road | 0-100 percent |
| Bumpy or Uneven Road | 0-75 percent |
| Wet or Icy Road | 0-50 percent |
| Gravel Road | 0-100 percent |
| Dirt Road | 0-100 percent |

In various embodiments, the EBU 105 and/or the ECU 110 is able to adjust the rear brakes 130 based on Table I so that the vehicle 102 application of the rear brakes 130 is based on the smallest range given the outside and/or road conditions. For example, if the vehicle 102 is travelling on a decline, the vehicle 102 can only brake up to 75 percent even if it is sunny outside. The vehicle 102 may have additional sensors, e.g., weather condition sensor, rain sensor, road condition sensor, gyroscope, GPS sensor, etc., to detect the outside and road conditions.

The electronic parking brake control system 100 includes a vehicle speed sensor configured to detect or measure a speed of the vehicle. The vehicle speed sensor can be coupled to the speedometer to measure, detect or receive the speed of the vehicle. In certain situations, the electronic parking brake control system 100 can be disabled. For example, if the speed of the vehicle is greater than a threshold speed, then the electronic parking brake control system 100 does not allow application or activation of the rear brakes 130. The threshold speed may be at or less than 5 miles per hour (mph), 10 mph, 15 mph, 20 mph, 25 mph, 30 mph, 35 mph, or 40 mph or higher. This allows the driver to gradually apply the rear brakes of the vehicle when the vehicle is travelling at a slow speed.

The electronic parking brake control system 100 includes a driving mode sensor configured to determine when the vehicle is in a low gear. The driving mode sensor can be coupled to the ECU 110, the transmission, the gears, or the motors of the vehicle. In certain situations, the electronic parking brake control system 100 can be disabled. For example, if the vehicle is not in a low gear, then the electronic parking brake control system 100 does not allow application or activation of the rear brakes 130. The low gear may be when the vehicle is in a 4-wheel drive mode, a first gear, a second gear, or a third gear. For electric vehicles, there may be only one gear. This allows the driver to gradually apply the rear brakes of the vehicle when the vehicle is travelling at a slow speed.

The EBU 105 and/or the ECU 110 receives the application signal 145 from the switch 115 and transmit a rear brake signal 155 to a plurality of rear brake actuators 155 to apply a plurality of rear brakes 130 based on the application signal 145 when the speed of the vehicle is below a threshold speed and/or the vehicle is in a low gear. The EBU 105 or the ECU 110 may convert the application signal 145 to a rear brake signal 155. For example, the application signal 145 may indicate a 25 percent application based on the driver pulling up the switch 115. As an example, the EBU 105 or the ECU 110 determines that a 25 percent application equates to the rear brake signal 155 moving the brake pads by 1 millimeter (mm). Hence, the EBU 105 or the ECU 110 would convert the 25 percent application to a mar brake signal 155 to the actuator or the electric motor 135 to move the rear brakes 130 a distance of 1 mm to increase the braking. Similarly, if the switch 115 is moved to reduce the application by 25 percent, the rear brake signal 155 would cause the actuator or the electric motor 135 to move the rear brakes 130 a distance of 1 mm to decrease the braking. The memory in the EBU 105 or the ECU 110 may include a table with values for the percent application and corresponding values for the rear brake signal 155 in order to achieve the proper movement of the rear brakes 130.

Figure 2:
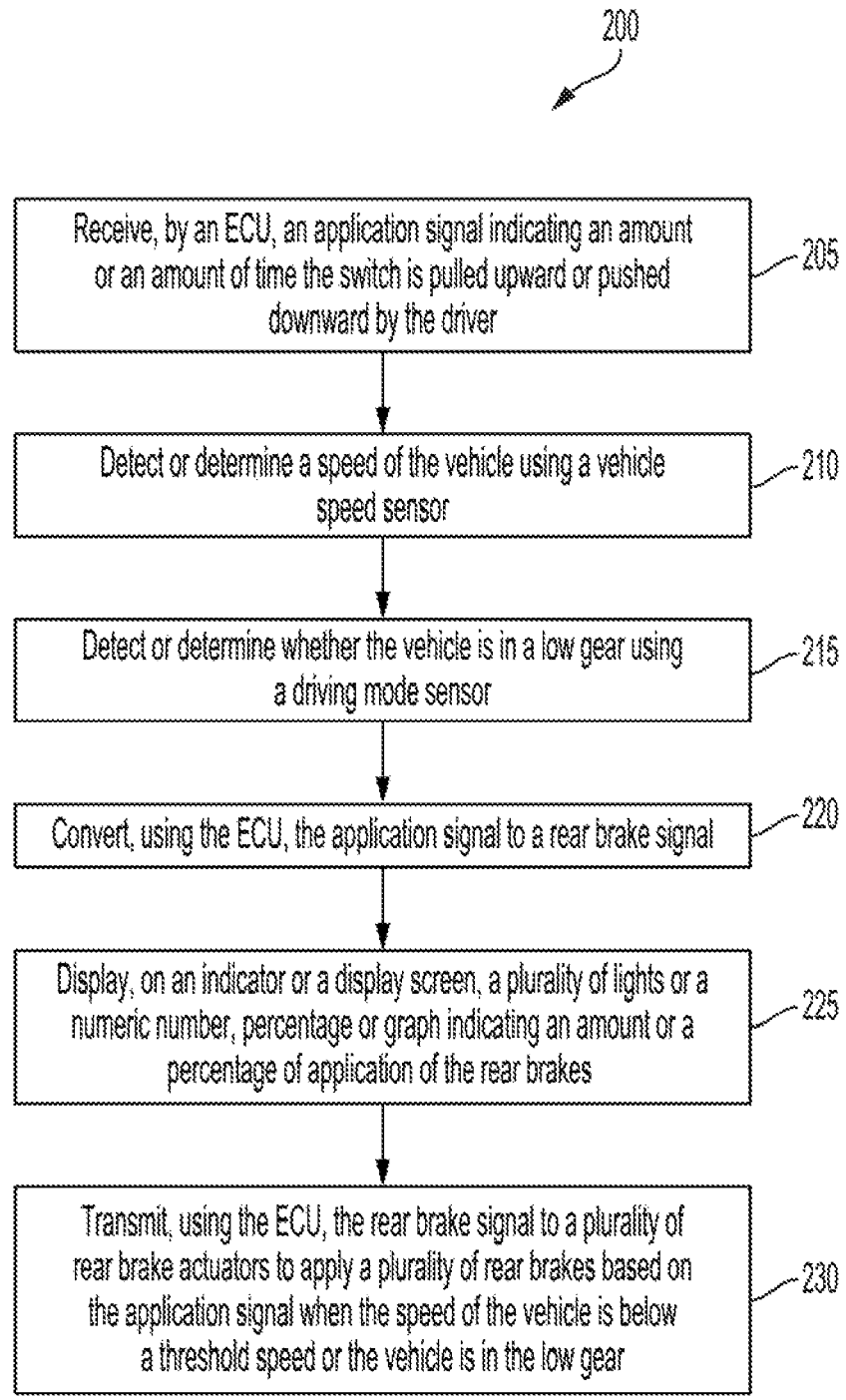
FIG. 2 is a flow chart of a process for controlling a parking brake or rear brakes of a vehicle according to an aspect of the invention.

FIG. 2 is a flow chart of a process 200 for controlling a parking brake or rear brakes 130 of a vehicle 102. One or more computers or one or more data processing apparatuses, for example, the EBU 105 and the ECU 110 of the electronic parking brake control system 100 of FIG. 1, appropriately programmed, may implement the process 200.

In order to activate or deactivate the rear brakes 130, the driver pulls up or pushes down the switch 115. The rear brakes 130 will be engaged or disengaged a certain amount depending on how much or how long the driver pulls or pushes the switch 115. The switch 115 may be similar to a power window switch in that it allows variable adjustment of the rear brakes 130. That is, the driver is able to variably adjust the percentage application of the rear brakes 130. The switch 115 is configured to generate or produce an application signal 145 based on an amount or an amount of time the switch 115 is pulled upward or pushed downward.

The EBU 105 and/or the ECU 110 receives an application signal 145 from the switch 115 (205). The application signal indicates an amount or an amount of time the switch is pulled upward or pushed downward by the driver (205).

The vehicle speed sensor 150 is used to detect or determine a speed of the vehicle 102(210). The driving mode sensor 140 is used to detect or determine whether the vehicle 102 is in a low gear (215).

The EBU 105 and/or the ECU 110 receives the application signal 145, converts the application signal 145 to a rear brake signal 155 (220).

The EBU 105 and/or the ECU 110 controls the display and/or the indicator 120 as to how many lights of the plurality of lights 121 are illuminated and the numeric number, percentage or graph. The number of lights illuminated and the numeric number, percentage or graph indicates an amount or a percentage of application of the rear brakes 130 based on the application signal 145 and/or the rear brake signal 155 (225).

The EBU 105 and/or the ECU 110 transmits the rear brake signal 155 to a plurality of rear brake actuators or motors 135 to apply a plurality of rear brakes 130 based on the application signal 145 when the speed of the vehicle is below a threshold speed or the vehicle is in the low gear (230).

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. An electronic parking brake control system for controlling rear brakes of a vehicle, comprising:
   a vehicle speed sensor configured to detect a speed of the vehicle;
   a driving mode sensor configured to determine whether the vehicle is in a low gear;
   an electronic parking brake variable switch configured to produce an application signal based on (i) an amount by which the electronic parking brake variable switch is pulled upward or pushed downward or (ii) an amount of time for which the electronic parking brake variable switch is pulled upward or pushed downward;
   an indicator configured to indicate an amount of application of the rear brakes based on the application signal; and
   an electronic control unit coupled to the electronic parking brake variable switch, the electronic control unit configured to transmit a rear brake signal to apply the rear brakes based on the application signal when the speed of the vehicle is below a threshold speed or the vehicle is in the low gear.

2. The electronic parking brake control system of claim 1 wherein the indicator is a plurality of lights.

3. The electronic parking brake control system of claim 1 wherein the indicator is a numeric number, percentage or graph displayed on a display screen of the vehicle.

4. The electronic parking brake control system of claim 1 wherein the indicator is coupled to the electronic parking brake variable switch.

5. The electronic parking brake control system of claim 1 wherein each of the rear brakes includes at least one of a brake disc, a brake drum or a brake rotor.

6. The electronic parking brake control system of claim 1 further comprising a memory coupled to the electronic control unit, the memory configured to store a plurality of percentage values for the application of the rear brakes and corresponding values for the rear brake signal for converting the application signal to the rear brake signal in order to achieve a prescribed movement of the rear brakes.

7. The electronic parking brake control system of claim 1 wherein the indicator is a display for displaying a variable percentage between 0 and 100 of the application of the rear brakes.

8. The electronic parking brake control system of claim 1 wherein the threshold speed is less than 25 miles per hour.

9. The electronic parking brake control system of claim 1 wherein the low gear is first gear.

10. The electronic parking brake control system of claim 1 wherein the low gear is second gear.

11. An electronic parking brake control system for controlling a parking brake of a vehicle, comprising:
   a vehicle speed sensor configured to detect a speed of the vehicle;
   a driving mode sensor configured to determine whether the vehicle is in a low gear;
   an electronic parking brake variable switch configured to produce an application signal based on (i) an amount by which the electronic parking brake variable switch is pulled upward or pushed downward or (ii) an amount of time for which the electronic parking brake variable switch is pulled upward or pushed downward;
   an indicator configured to indicate an amount of application of the parking brake based on the application signal; and
   an electronic brake unit coupled to the electronic parking brake variable switch, the electronic brake unit configured to:
      receive the application signal, and
      transmit a rear brake signal to a plurality of rear brake actuators to apply a plurality of rear brakes based on the application signal when the speed of the vehicle is below a threshold speed or the vehicle is in the low gear.

12. The electronic parking brake control system of claim 11 wherein the indicator is a plurality of lights.

13. The electronic parking brake control system of claim 11 wherein the indicator is a numeric number, percentage or graph displayed on a display screen of the vehicle.

14. The electronic parking brake control system of claim 11 wherein the indicator is coupled to the electronic parking brake variable switch.

15. The electronic parking brake control system of claim 11 wherein each of the plurality of rear brakes includes at least one of a brake disc, a brake drum or a brake rotor.

16. The electronic parking brake control system of claim 11 further comprising a memory coupled to the electronic brake unit, the memory configured to store a plurality of percentage values for the application of the plurality of rear brakes and corresponding values for the rear brake signal for converting the application signal to the rear brake signal in order to achieve a prescribed movement of the plurality of rear brakes.

17. The electronic parking brake control system of claim 11 wherein the indicator is a display for displaying a variable percentage between 0 and 100 of the application of the plurality of rear brakes.

18. The electronic parking brake control system of claim 11 wherein the threshold speed is less than 25 miles per hour.

19. The electronic parking brake control system of claim 11 wherein the low gear is first gear.

20. The electronic parking brake control system of claim 11 wherein the low gear is second gear.

\* \* \* \* \*